(12) United States Patent
Levin et al.

(10) Patent No.: US 11,036,534 B2
(45) Date of Patent: Jun. 15, 2021

(54) TECHNIQUES FOR SERVERLESS RUNTIME APPLICATION SELF-PROTECTION

(71) Applicant: Twistlock, Ltd., Herzliya (IL)

(72) Inventors: Liron Levin, Herzliya (IL); Dima Stopel, Herzliya (IL); Michael Velbaum, Herzliya (IL); Alon Adler, Bat-Yam (IL); Michael Kletselman, Tel Aviv (IL); John Morello, Baton Rouge, LA (US)

(73) Assignee: TWISTLOCK, Ltd., Herzliya (IL)

( * ) Notice: Subject to any disclaimer, the term of this patent is extended or adjusted under 35 U.S.C. 154(b) by 467 days.

(21) Appl. No.: 16/144,347

(22) Filed: Sep. 27, 2018

(65) Prior Publication Data
US 2020/0026850 A1 Jan. 23, 2020

Related U.S. Application Data

(60) Provisional application No. 62/700,586, filed on Jul. 19, 2018.

(51) Int. Cl.
*G06F 9/455* (2018.01)
*H04L 29/06* (2006.01)
(Continued)

(52) U.S. Cl.
CPC ...... *G06F 9/45558* (2013.01); *G06F 9/44505* (2013.01); *G06F 16/2379* (2019.01); *G06F 21/51* (2013.01); *G06F 21/53* (2013.01); *G06F 21/54* (2013.01); *G06K 9/6256* (2013.01); *G06N 20/00* (2019.01); *H04L 63/20* (2013.01);
(Continued)

(58) Field of Classification Search
CPC .............. G06F 9/4558; G06F 16/2379; G06F 9/44505; G06F 21/51; G06F 21/53; G06F 21/54; G06F 21/552; G06F 9/455; G06F 2009/45583; G06F 2009/45591; G06F 2009/45595; G06F 2009/45587;
(Continued)

(56) References Cited

U.S. PATENT DOCUMENTS 8,589,403 B2 11/2013 Marquardt et al.
8,769,684 B2 7/2014 Stolfo et al.
(Continued)

*Primary Examiner* — Benjamin A Kaplan
(74) *Attorney, Agent, or Firm* — M&B IP Analysts, LLC.

(57) ABSTRACT

A system and method for serverless runtime application self-protection. The method includes embedding a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

21 Claims, 3 Drawing Sheets

(51) Int. Cl.
*G06F 16/23* (2019.01)
*G06N 20/00* (2019.01)
*G06F 21/53* (2013.01)
*G06K 9/62* (2006.01)
*G06F 9/445* (2018.01)
*G06F 21/51* (2013.01)
*G06F 21/54* (2013.01)

(52) U.S. Cl.
CPC ............. *G06F 2009/45583* (2013.01); *G06F 2009/45587* (2013.01); *G06F 2009/45591* (2013.01); *G06F 2009/45595* (2013.01)

(58) Field of Classification Search
CPC ...... G06N 20/00; G06K 9/6256; H04L 63/20; H04L 63/1408
USPC ......................................................... 726/22
See application file for complete search history.

(56) References Cited

U.S. PATENT DOCUMENTS

| | | | |
|---|---|---|---|
| 9,794,275 B1 | 10/2017 | Benameur et al. | |
| 10,110,600 B1 | 10/2018 | Simca | |
| 10,397,255 B1 | 8/2019 | Bhalotra et al. | |
| 10,474,934 B1 | 11/2019 | Cosic | |
| 10,572,375 B1 | 2/2020 | Wagner | |
| 10,621,019 B1 | 4/2020 | Faulhaber, Jr. et al. | |
| 10,713,543 B1 | 7/2020 | Skuin et al. | |
| 10,951,648 B2 | 3/2021 | Doron et al. | |
| 2016/0350173 A1 | 12/2016 | Ahad | |
| 2016/0359695 A1 | 12/2016 | Yadav et al. | |
| 2017/0220651 A1 | 8/2017 | Mathew et al. | |
| 2017/0353477 A1 | 12/2017 | Faigon et al. | |
| 2018/0060581 A1 | 3/2018 | El-Moussa et al. | |
| 2018/0083833 A1 | 3/2018 | Zoll et al. | |
| 2018/0091531 A1 | 3/2018 | El-Moussa et al. | |
| 2018/0196732 A1 | 7/2018 | Dolev et al. | |
| 2018/0285563 A1 | 10/2018 | Browne et al. | |
| 2018/0288091 A1 | 10/2018 | Doron et al. | |
| 2018/0309770 A1 | 10/2018 | Han et al. | |
| 2018/0351838 A1 | 12/2018 | Lui | |
| 2019/0044963 A1 | 2/2019 | Rajasekharan et al. | |
| 2019/0068627 A1 | 2/2019 | Thampy | |
| 2019/0121979 A1 | 4/2019 | Chari et al. | |
| 2019/0179678 A1* | 6/2019 | Banerjee | G06F 9/5072 |
| 2019/0286826 A1 | 9/2019 | Bargury et al. | |
| 2019/0294477 A1* | 9/2019 | Koppes | G06F 9/5072 |
| 2019/0294960 A1 | 9/2019 | Niemi | |
| 2019/0377625 A1 | 12/2019 | Chintalapati et al. | |
| 2020/0183769 A1 | 6/2020 | Poghosyan et al. | |

\* cited by examiner

TECHNIQUES FOR SERVERLESS RUNTIME APPLICATION SELF-PROTECTION

CROSS-REFERENCE TO RELATED APPLICATIONS

This application claims the benefit of U.S. Provisional Application No. 62/700,586 filed on Jul. 19, 2018, the contents of which are hereby incorporated by reference.

TECHNICAL FIELD

The present disclosure relates generally to runtime protection of applications, and more specifically to runtime application self-protection (RASP).

BACKGROUND

In modern cloud native environments, virtual machines are typically deployed through automation and operate as stateless entities. The Cloud Native Computing Foundation defines cloud native technologies as involving building and running scalable applications in modern, dynamic environments such as public, private, and hybrid clouds. Example cloud native technologies include containers, service meshes, microservices, immutable infrastructure, and declarative application programming interface (API).

Cloud native virtual machines (VMs) are designed to run containers directly or to run stateless workloads in support of containerized applications, are dynamically deployed and orchestrated with minimal human involvement, and are focused on hosting and running microservices. Such cloud native VMs may be targets for attackers seeking to disrupt businesses or steal data.

To support activities of their customers, cloud providers may offer serverless computing as part of their offerings. Serverless computing is a cloud-computing execution model in which the cloud provider's computing resources are used to offer their customer's services or applications. Using serverless computing, customers do not need to actively provision or manage servers. Thus, the customers do not need to purchase or maintain hardware, and scaling may be handled by the cloud provider. AWS Lambda, offered by Amazon®, is an example of a serverless computing model.

One type of serverless computing is serverless applications, in which application logic is executed on systems of a cloud provider. The data used for the application logic may be stored elsewhere. Since functions are executed by the cloud provider, a customer does not need to directly address fault tolerance and availability.

Existing solutions for providing runtime security defense utilize a server or other external system that interacts with an application. These solutions may offer sufficient security, but face challenges in use with serverless computing. In particular, since the customer lacks control over the environment in which their services or applications are executed when using a serverless computing model, they typically must rely on security systems provided by the cloud service provider. Depending on the particular security features required by the application, this may not result in sufficient security.

Some existing solutions allow for securing applications more directly. Specifically, runtime application self-protection (RASP) provides security functions built into an application that allow the application to defend itself from potential security threats. To this end, resources for monitoring execution of the application and triggering the application's security functions are implemented in the server(s) on which the application runs, thereby providing security functions that are run in conjunction with the application functions.

Although runtime security defense may be integrated within the application itself, such integration requires manual modification of the application code by a programmer. This is inconvenient, as the application owner must either allow access to the code by the service provider or hire a programmer to perform the integration. Further, when implementing an application via serverless computing, the code must be integrated with the cloud provider's systems. Also, the manual integration is subject to human error that may cause bugs or other issues with the integrated code.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for serverless runtime application self-protection. The method comprises: embedding a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

Certain embodiments disclosed herein also include a non-transitory computer readable medium having stored thereon causing a processing circuitry to execute a process, the process comprising: embedding a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

Certain embodiments disclosed herein also include a system for serverless runtime application self-protection. The system comprises: a processing circuitry; and a memory, the memory containing instructions that, when executed by the processing circuitry, configure the system to: embed a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
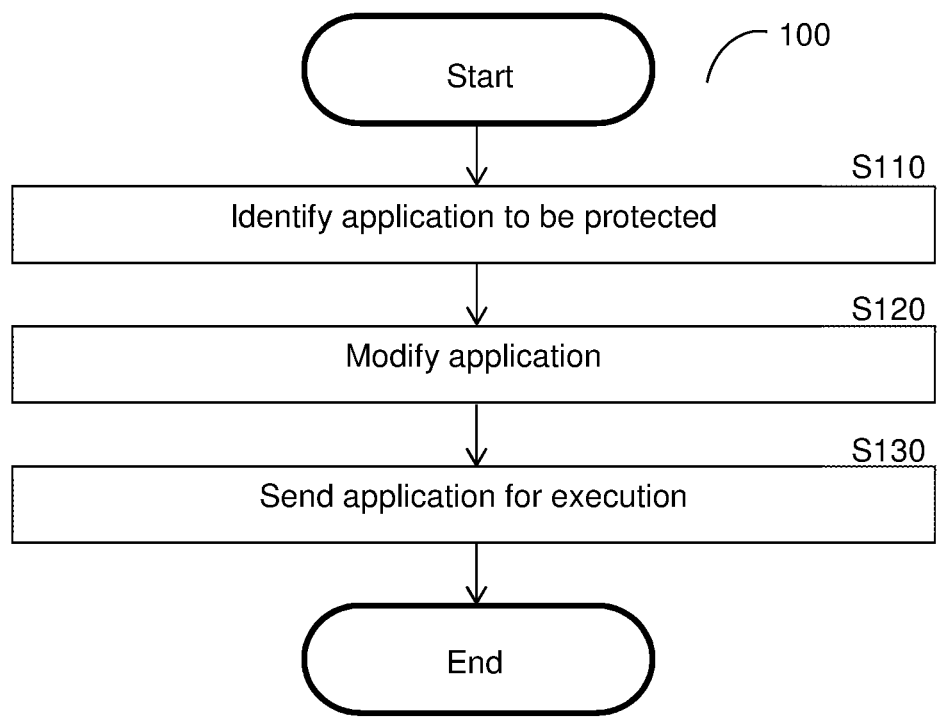
FIG. 1 is a flowchart illustrating a method for configuring a serverless application according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a serverless application creator and a method for serverless runtime application self-protection (RASP) providing runtime security by directly embedding a serverless defender into an application's code without requiring any manual modification of application code. To this end, in an embodiment, a security policy including rules for the serverless defender is defined in a serverless application creator. The security policy defines rules for allowed activities with respect to execution of the serverless application, thereby allowing for automated monitoring of application execution and detection of activity that is not allowed for the application.

The serverless defender is a function that is automatically embedded into the application by running a command-line utility which takes the path to the file (e.g., a ZIP file) containing the application deployment bundle to create a serverless application. The embedding includes modifying the file to add a serverless defender shared library and the security policy for the serverless defender. Specifically, a function serverless bundle of the file may be modified. The embedding also includes injecting loader code configured to load the serverless defender upon startup of the application. In some implementations, environmental variables used for injecting the loader code may be hidden to avoid malicious code from detecting that the serverless defender has been installed. The modifications to the file depend on the programming language used by the application.

The serverless defender can be utilized to protect serverless applications. The serverless applications may be provided via a serverless computing platform such as, but not limited to, AWS Lambda. Because the serverless defender is incorporated into the file of the application, resources of the serverless defender are available to whichever system accesses the application.

A new protected file is created based on the modified file. The protected file includes the code and resources needed for execution of the serverless application with the serverless defender. The protected file may be uploaded to a cloud service for execution of the serverless application. When the serverless application is initially invoked, the injected loader code runs the serverless defender shared library, which installs hooks into functions including interactions with a kernel of a system executing the serverless application (e.g., system calls, networking functions, spawning processes, library functions, etc.), and to only allow running of processes that satisfy the security policy. The hooks are installed into a main application and any of its dependent shared libraries. The serverless defender shared library also persists itself into any subprocesses by using a load/preload mechanism.

In an embodiment, the serverless defender is invoked only when system calls or library functions occur, thereby minimizing impact on application performance due to repeated invocations. When the security policy is violated (e.g., when an attempt to run a process that is not whitelisted is made), an audit is produced and sent to the cloud service provider's log system, to the serverless application creator, or both.

In an embodiment, given an existing task definition, the serverless defender is configured to generate a protected task by augmenting data. The protected task may be used to create a new task. As a non-limiting example, a new Fargate Task may be created based on the protected task. To this end, a sidecar container is modified to use an image of the serverless defender and to share a volume with the serverless defender. On bootstrap (e.g., when a bootstrap loader is initialized), the modified sidecar container is configured to copy an executable file of the serverless defender and the serverless application shared library to the shared volume. Each container in the task mounts the shared volume and uses the executable file of the serverless defender as its entry point.

In an embodiment, the serverless defender that is running as the entry point of each container in a cloud computing environment (e.g., a server of a cloud computing platform) is configured to execute the container's original entry point, to attach the serverless application shared library to all processes in the container (e.g., by modifying a load-related environmental variable to include the shared library), to monitor violations in the container, and to send audits to the serverless application creator. The shared library hijacks all functions including interactions with a system kernel and allows processes to run only if permitted by the security policy of the container defined in the serverless defender. When the security policy is violated, an audit is generated and sent to the serverless application creator, for example by inter-process communication.

FIG. 1 is an example flowchart 100 illustrating a method for serverless runtime application self-protection according to an embodiment. In an embodiment, the method is performed by the serverless application creator 300, FIG. 3.

At S110, an application to be protected is identified. The application to be protected may be an existing application identified in a request for runtime application self-protection modification, a new application, and the like. In an embodiment, the application is a serverless application to be executed in, for example a cloud computing environment.

At S120, the application to be protected is configured with a serverless defender. In an embodiment, S120 includes modifying a file of the application to create a protected file including code and resources used for executing the serverless defender. To this end, S120 may include injecting loader code for loading the serverless defender upon startup of the application. The loader code may be injected into a function serverless bundle of the file. The serverless defender resources include a serverless defender library and a security policy for the serverless defender.

In an embodiment, S120 further includes running a command-line utility which takes the path to the file containing the application deployment bundle. To this end, S120 may include identifying this path.

At optional S130, the protected file of the modified serverless application is sent for execution. In an embodiment, S130 includes uploading the modified serverless application with the to a cloud service for execution. Once uploaded, the serverless defender is loaded upon startup of the application and is invoked when appropriate, for example as defined in the security policy. In some implementations, the serverless application may be executed in the system that created the protected file.

Figure 2:
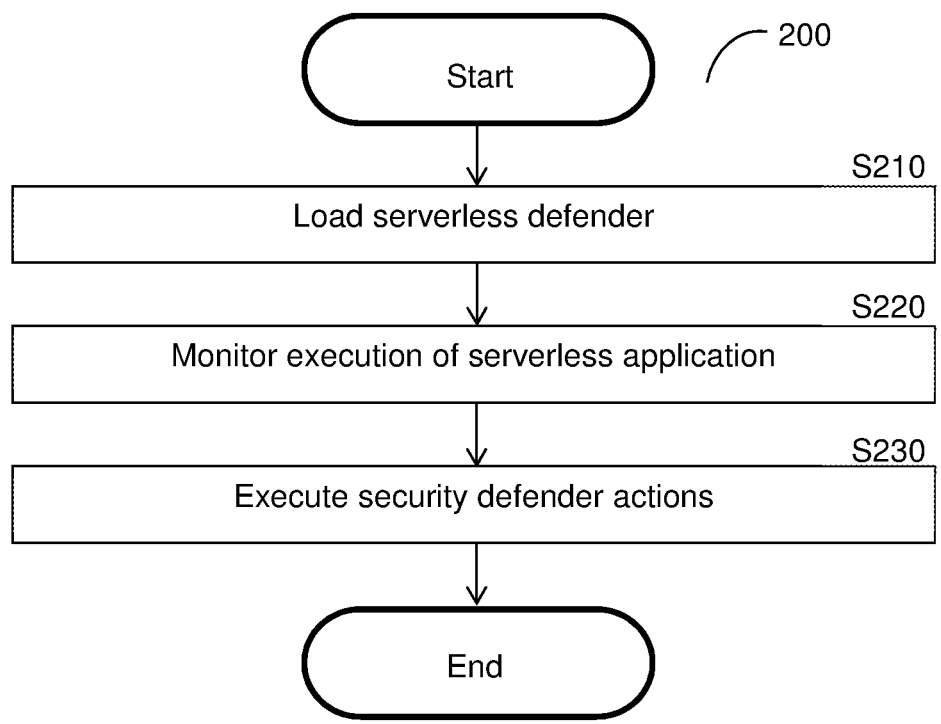
FIG. 2 is a flowchart illustrating a method for serverless runtime application self-protection by a serverless application configured according to an embodiment.

FIG. 2 is an example flowchart 200 illustrating a method for serverless RASP by a serverless application configured with a serverless defender according to an embodiment. In an embodiment, the serverless application is configured with a serverless defender as described with respect to FIG. 1. The serverless application configured with the serverless defender includes resources such as a serverless defender shared library and a security policy.

At S210, the serverless application is initiated and the serverless defender is loaded. In an embodiment, the serverless defender is loaded via loading code in the file of the serverless application upon startup of the serverless application. The loader code runs the serverless defender shared library to install hooks into system calls, library functions, or both, used to spawn processes. The hooks alter the behavior of the serverless application such that only processes that satisfy a security policy for the serverless defender are allowed to run. In an example implementation, the serverless application is initiated via one or more servers in a cloud environment.

At S220, execution of the serverless application is monitored. In an embodiment, S220 includes invoking the serverless defender when a system call or library function occurs. When invoked, the serverless defender is configured to determine whether the security policy has been violated.

At S230, when the security policy has been violated, one or more actions of the serverless defender are performed. Such actions may include one or more mitigation actions such as, but not limited to, sending a report or alert, ceasing execution of one or more functions or of the serverless application, altering execution of the serverless application, and the like. The actions are defined in the code for the serverless defender embedded into the serverless application file. The report may include an audit which may indicate, for example, the system call which triggered the serverless defender, the security policy that has been violated, and the like.

Figure 3:
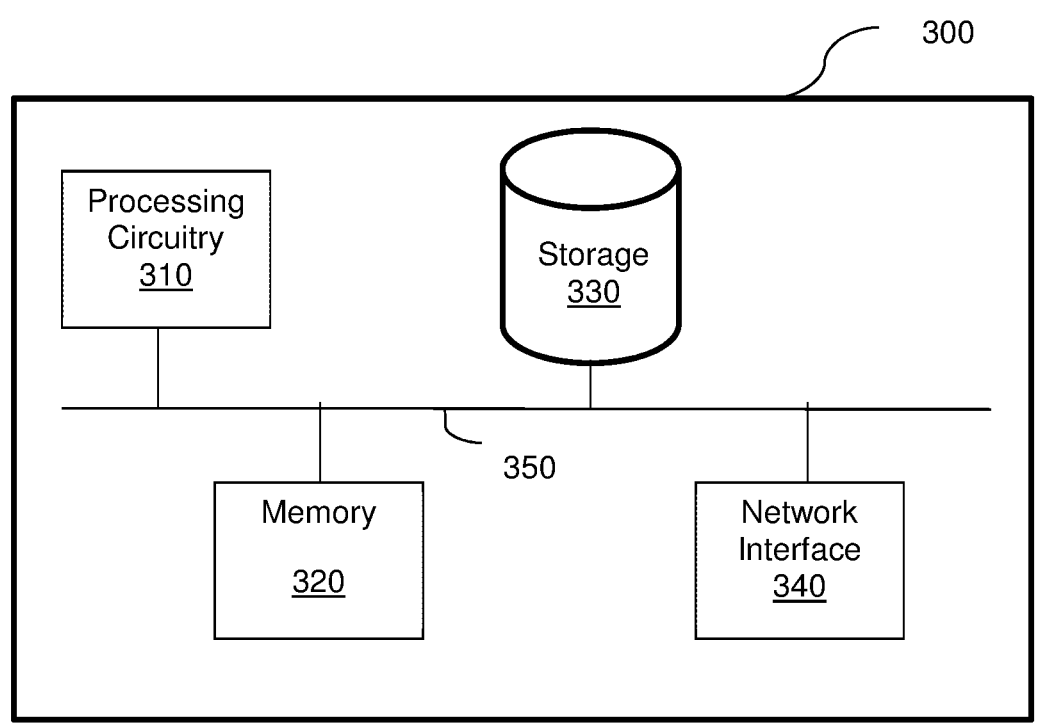
FIG. 3 is a schematic diagram of a serverless application creator according to an embodiment.

FIG. 3 is an example schematic diagram of a serverless application creator 300 according to an embodiment. The serverless application creator 300 includes a processing circuitry 310 coupled to a memory 320, a storage 330, and a network interface 340. In another embodiment, the components of the serverless application creator 300 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, cause the processing circuitry 310 to perform an on-demand authorization of access to protected resources, as discussed hereinabove.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the serverless application creator 300 to communicate for the purpose of, for example, receiving training data sets, uploading normal behavior models to cloud services, and the like. Additionally, the network interface 340 may be utilized to send alerts indicating deviations from normal behaviors with respect to capabilities to external systems configured to perform mitigation actions with respect to the abnormally behaving VM.

It should be understood that the embodiments described herein are not limited to the specific architecture illustrated in FIG. 2, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for serverless runtime application self-protection, comprising:
    embedding a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

2. The method of claim 1, wherein the embedding further comprises:
    injecting loader code into the function serverless bundle, wherein the loader code, when executed by a system, configures the system to load the serverless defender upon startup of the serverless application.

3. The method of claim 2, further comprising:
    hiding at least one environmental variable used to inject the loader code.

4. The method of claim 1, wherein the at least one mitigation action includes generating an audit, wherein the audit is a report indicating a violation of the security policy.

5. The method of claim 1, wherein the serverless defender is invoked when a system call occurs.

6. The method of claim 1, wherein the serverless defender is configured to generate a protected task based on each of at least one task definition of the serverless application.

7. The method of claim 1, further comprising:
    modifying a sidecar container to use an image of the serverless defender and to share a volume with the serverless defender, wherein the modified sidecar container is configured to copy an executable file of the serverless defender and the serverless application shared library to the shared volume.

8. The method of claim 1, further comprising:
    uploading the function serverless bundle to a cloud computing platform for execution of the serverless application and the serverless defender by the cloud computing platform.

9. The method of claim 1, wherein the serverless defender is run as a first entry point of each of at least one container of the system, wherein the serverless defender is configured to execute a second entry point of each of the at least one container, and to attach the serverless application shared library to each process of each of the at least one container, wherein the second entry point is an original entry point of the container.

10. The method of claim 1, wherein the serverless application shared library is configured to hijack all functions including interaction with a kernel by the serverless application, wherein the kernel is a kernel of a system executing the serverless application.

11. A non-transitory computer readable medium having stored thereon instructions for causing a processing circuitry to execute a process, the process comprising:
    embedding a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

12. A system for serverless runtime application self-protection, comprising:

a processing circuitry; and a memory, the memory containing instructions that, when executed by the processing circuitry, configure the system to:

embed a serverless defender function into a function serverless bundle containing an application deployment bundle of a serverless application, wherein the embedding further comprises modifying the function serverless bundle to include a serverless defender shared library and a security policy, wherein the serverless defender shared library is configured to install at least one hook into at least one system call of the serverless application when the serverless application is executed, wherein each hook only allows running of system calls and library functions that satisfy the security policy during execution of the serverless application, wherein the serverless defender function is loaded at a system when the serverless application is initiated by the system, wherein the serverless defender function is configured to perform at least one mitigation action when the security policy is violated during execution of the serverless application.

13. The system of claim 12, wherein the system is further configured to:

inject loader code into the function serverless bundle, wherein the loader code, when executed by a system, configures the system to load the serverless defender upon startup of the serverless application.

14. The system of claim 13, wherein the system is further configured to:

hide at least one environmental variable used to inject the loader code.

15. The system of claim 12, wherein the at least one mitigation action includes generating an audit, wherein the audit is a report indicating a violation of the security policy.

16. The system of claim 12, wherein the serverless defender is invoked when a system call occurs.

17. The system of claim 12, wherein the serverless defender is configured to generate a protected task based on each of at least one task definition of the serverless application.

18. The system of claim 12, wherein the system is further configured to:

modify a sidecar container to use an image of the serverless defender and to share a volume with the serverless defender, wherein the modified sidecar container is configured to copy an executable file of the serverless defender and the serverless application shared library to the shared volume.

19. The system of claim 12, wherein the system is further configured to:

upload the function serverless bundle to a cloud computing platform for execution of the serverless application and the serverless defender by the cloud computing platform.

20. The system of claim 12, wherein the serverless defender is run as a first entry point of each of at least one container of the system, wherein the serverless defender is configured to execute a second entry point of each of the at least one container, and to attach the serverless application shared library to each process of each of the at least one container, wherein the second entry point is an original entry point of the container.

21. The system of claim 12, wherein the serverless application shared library is configured to hijack all functions including interaction with a kernel by the serverless application, wherein the kernel is a kernel of a system executing the serverless application.

* * * * *